United States Patent
Okoshi

(10) Patent No.: US 8,038,302 B2
(45) Date of Patent: Oct. 18, 2011

(54) PROJECTOR INCLUDING AN IMAGE PROJECTING DEVICE AND AN INTERIOR COOLING DEVICE

(75) Inventor: Masayuki Okoshi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 495 days.

(21) Appl. No.: 12/070,449

(22) Filed: Feb. 19, 2008

(65) Prior Publication Data

US 2008/0246924 A1    Oct. 9, 2008

(30) Foreign Application Priority Data

Mar. 28, 2007    (JP) ................... 2007-083475

(51) Int. Cl.
  *G03B 21/18*    (2006.01)
  *G03B 21/26*    (2006.01)
(52) U.S. Cl. .......................... 353/58; 353/61
(58) Field of Classification Search ............ 353/31, 353/57, 61, 119, 58
  See application file for complete search history.

(56) References Cited

U.S. PATENT DOCUMENTS

| 6,416,184 B1 * | 7/2002 | Arai et al. ................. 353/52 |
| 6,840,628 B2 * | 1/2005 | Arai et al. ................. 353/58 |
| 2004/0095559 A1 * | 5/2004 | Arai et al. ................. 353/57 |
| 2005/0200814 A1 * | 9/2005 | Hsu et al. ................. 353/52 |
| 2006/0152684 A1 * | 7/2006 | Lin et al. ................. 353/58 |

FOREIGN PATENT DOCUMENTS

| JP | 2005-084221 A | 3/2005 |
| JP | 2006-072010 A | 3/2006 |
| JP | 2006-072037   | 3/2006 |
| JP | 2006-330379   | 12/2006 |
| JP | 2006-343566   | 12/2006 |
| JP | 2007-072058 A | 3/2007 |

* cited by examiner

*Primary Examiner* — Francis M Legasse, Jr.
(74) *Attorney, Agent, or Firm* — AdvantEdge Law Group, LLC

(57) ABSTRACT

A projector includes an exterior casing that includes an air intake port for introducing outside air into the interior thereof; and a cooling device that cools the interior of the exterior casing by the outside air introduced via the air intake port, in which the cooling device includes a first sirocco fan and a second sirocco fan that discharge air taken along axes of rotation of the fans to the direction along tangent of rotation, and an air intake port-side duct that guides the outside air introduced via the air intake port toward the first sirocco fan and the second sirocco fan, and in which the first sirocco fan and the second sirocco fan are disposed with axes of rotation thereof oriented so as to intersect with each other.

3 Claims, 7 Drawing Sheets

PROJECTOR INCLUDING AN IMAGE PROJECTING DEVICE AND AN INTERIOR COOLING DEVICE

BACKGROUND

1. Technical Field

The present invention relates to a projector.

2. Related Art

In the related art, a projector provided with an image projecting device which modulates luminous flux emitted from a light source according to image information and projects the same in an enlarged scale is known.

The projector of this type includes heat-generating devices (for example, objects to be cooled such as a liquid crystal panel or a power unit) integrated therein, and hence it is required to cool these heat-generating devices (objects to be cooled) in order to ensure normal operation of various devices. Therefore, the projector of this type is provided with a cooling fan for cooling the objects to be cooled in the interior of an exterior casing (for example, see JP-A-2006-72037 and JP-A-2006-343566).

However, as a projector disclosed in JP-A-2006-72037 is configured to cool the objects to be cooled as described above with one cooling fan, it is required to increase the capacity of the cooing fan, and hence upsizing of the entire projector is pointed out as a problem.

On the other hand, a projector disclosed in JP-A-2006-343566 is provided with a cooling fan so as to be superimposed on an optical system, and hence it is required to secure a space between the optical system and an exterior casing. Therefore, upsizing of the entire projector is pointed out as a problem in this case as well.

SUMMARY

An advantage of some aspects of the invention is that a projector which is downsized as a whole and is capable of cooling objects to be cooled integrated therein efficiently is provided.

In order to solve the above described problem, a projector according to an aspect of the invention includes an image projecting device that modulates luminous flux emitted from a light source according to image information and projects the same in an enlarged scale, and an exterior casing that includes an air intake port for introducing outside air into the interior thereof and accommodates the image projecting device in the interior thereof, and a cooling device that cools the interior of the exterior casing by the outside air introduced via the air intake port, in which the cooling device includes a first sirocco fan and a second sirocco fan that discharge air taken along axes of rotation of the fans to the direction along tangent of rotation, and an air intake port-side duct that guides the outside air introduced via the air intake port toward the first sirocco fan and the second sirocco fan, and in which the first sirocco fan and the second sirocco fan are disposed with axes of rotation thereof oriented so as to intersect with each other.

In this configuration, cooling air is generated by the two first and second sirocco fans, and hence the sirocco fans in compact design in comparison with those in the related art may be employed. Accordingly, the entire mass is reduced while maintaining suction wind force (cooling capacity) by the two first and second sirocco fans.

The first sirocco fan and the second sirocco fan are arranged with the axes of rotation thereof oriented so as to intersect with each other. Therefore, the outside air as the cooling air can be discharged in various directions. Accordingly, ducts arranged from the sirocco fans to objects to be cooled provided at various positions in the interior of the projector for introducing the cooling air are shortened so that the entire mass is reduced.

Therefore, the objects to be cooled integrated therein are efficiently cooled while achieving downsizing of the entire projector.

Preferably, the air intake port-side duct includes a hollow member which has a substantially parallelepiped shape and introduces the outside air into the interior thereof, the hollow member is formed with a first deriving port and a second deriving port that derive the outside air introduced in the interior thereof to the first sirocco fan and the second sirocco fan respectively on a first side wall and a second side wall of the hollow member which intersect with each other, and the first sirocco fan and the second sirocco fan are disposed so as to oppose the first deriving port and the second deriving port, respectively.

In this configuration, the first side wall and the second side wall of the hollow member which intersect with respect to each other are formed respectively with the first deriving port and the second deriving port that derive the outside air to the sirocco fans, and the first sirocco fan and the second sirocco fan are disposed so as to oppose respectively to the first deriving port and the second deriving port. Therefore, the entire mass is reduced while discharging the cooling air in the various directions.

Preferably, the air intake port-side duct is provided with a partitioning wall in the interior thereof so as to define flow channels respectively for the first sirocco fan and the second sirocco fan.

In this configuration, since the air intake port-side duct is provided with the partitioning wall in the interior thereof so as to define flow channels respectively for the two sirocco fans, areas in the interior of the air intake port-side duct may be set according to the cooling capacity or the desired amount of blowing air even when the cooling capacities of the two sirocco fans are different or setting of the amount of air to be blown onto the objects to be cooled as needed is desired. Therefore, the objects to be cooled are cooled more efficiently.

Preferably, the cooling device is disposed at a position opposite side from the direction of projection of the image projecting device with respect to the image projecting device, the first sirocco fan is disposed so as to discharge taken air toward the image projecting device, and the second sirocco fan is disposed so as to discharge taken air in the direction substantially orthogonal to the direction of projection.

In this configuration, the cooling device is arranged at the position opposite from the direction of projection of the image projecting device with respect to the image projecting device, the first sirocco fan is disposed so as to discharge the taken air toward the image projecting device, and the second sirocco fan is disposed so as to discharge the taken air in the direction substantially orthogonal to the direction of projection. Therefore, the cooling air generated by the first sirocco fan can easily be guided toward the image projecting device as the objects to be cooled, and the cooling air generated by the second sirocco fan can easily be guided toward a lamp drive circuit as the object to be cooled existing in the direction orthogonal to the direction of projection. Accordingly, the mass of the duct for guiding the cooling air may be reduced, so that downsizing of the entire projector is achieved.

Preferably, the image projecting device is provided with a projecting position adjusting device that adjusts the position of an optical image to be projected on the side of the direction of projection of the image projecting device.

In this configuration, since the projecting position adjusting device that adjusts the position of the optical image to be projected is arranged on the side of the direction of projection of the image projecting device, if the cooling device is arranged on the side of the direction of projection, the projector is upsized. With the configuration of the projector provided with the projecting position adjusting device as described above, the downsizing of the projector is achieved further efficiently.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
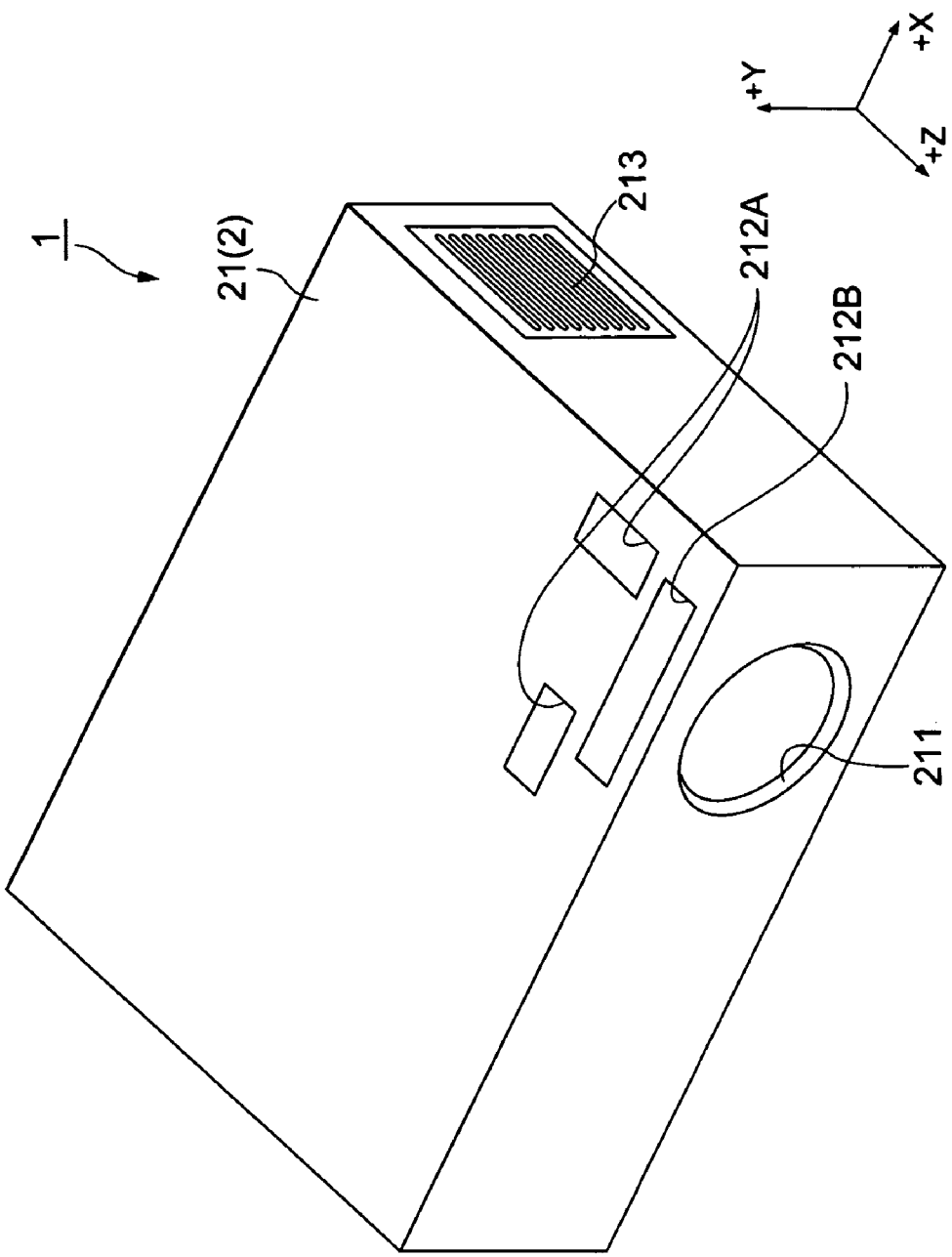
FIG. 1 is an appearance pattern diagram of a projector according to an aspect of the invention.
Figure 2:
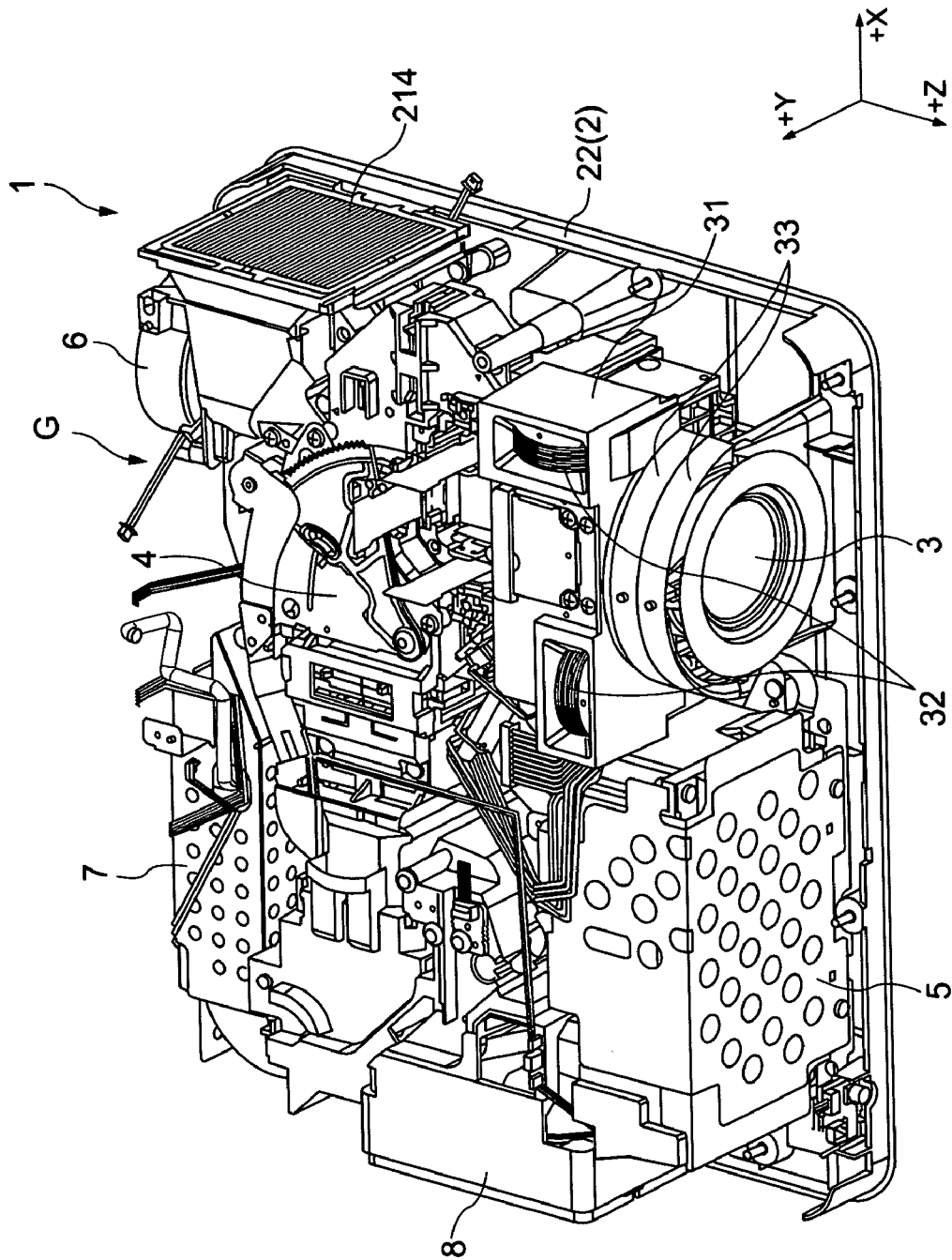
FIG. 2 is an internal perspective view showing the interior of the projector.

Referring now to the drawings, embodiments of a projector according to an aspect of the invention will be described. FIG. 1 is an appearance pattern diagram of a projector 1. FIG. 2 is an internal perspective view showing the interior of the projector 1. In the following description, the direction of projection of an image light emitted from the projector 1 is designated as a Z-axis, and two axes orthogonal to the Z-axis are designated as an X-axis (horizontal axis) and a Y-axis (vertical axis), respectively throughout the drawings.

The projector 1 modulates luminous flux emitted from a light source according to image information, forms an optical image (image light), and projects the formed optical image on a screen in an enlarged scale.

The projector 1 roughly includes an exterior casing 2, an image projecting device G, a power unit 5, a cooling device 6, a lamp drive circuit (ballast) 7, an exhaust fan unit 8 and a control board, not shown, as shown in FIGS. 1 and 2. The image projecting device G includes a projection lens 3 and an optical unit 4. The control board, not shown, is electrically connected to the optical unit 4, the power unit 5, the cooling device 6, the lamp drive circuit (ballast) 7 and the exhaust fan unit 8 and controls these members.

The exterior casing 2 is composed of a box-shaped casing having substantially parallelepiped shape as shown in FIGS. 1 and 2. The exterior casing 2 includes an upper case 21 which defines a top surface (the surface on the side of the +Y-axis direction) portion, a front face (the face on the side of the +Z-axis direction) portion, side face (respective surfaces which intersect the X-axis direction) portions and a back surface (the surface on the side of the −Z-axis direction) portion of the projector 1, and a lower case 22 which defines a bottom surface (the surface on the side of the −Y-axis direction) portion of the projector 1.

As shown in FIG. 1, the front face portion of the exterior casing 2 is provided with a front face opening 211 for allowing projection of the image light from the projection lens 3 onto the screen. The top face portion of the exterior casing 2 is provided with a first operation opening 212A for exposing an operation dial 32 of a projecting position adjusting device 31, and with a second operation opening 212B for exposing an image adjusting unit 33.

Furthermore, the side face portion of the exterior casing 2 on the side of the −Z-axis direction is provided with an air intake port 213 which is opened for taking outside air into the interior of the projector 1. As shown in FIG. 2, the air intake port 213 is attached with a dust-removing filter 214 for preventing foreign substances from entering into the interior of the projector 1 (exterior casing 2) via the air intake port 213.

The projection lens 3 includes a plurality of lenses and a cylindrical lens-barrel for storing the plurality of lenses, although they are not shown in detail in the drawing, and projects color images formed by the optical unit 4 in an enlarged scale. The projection lens 3 includes the projecting position adjusting device 31 that moves the plurality of lenses in a plane orthogonal to the direction of projection (+Z-axis direction) and adjusts the position of the projected optical image. The lens-barrel is configured to be capable of changing the relative positions of the plurality of lenses by being rotated about a cylindrical shaft, and includes an image adjusting unit 35 for causing the cylindrical shaft to rotate.

Figure 3:
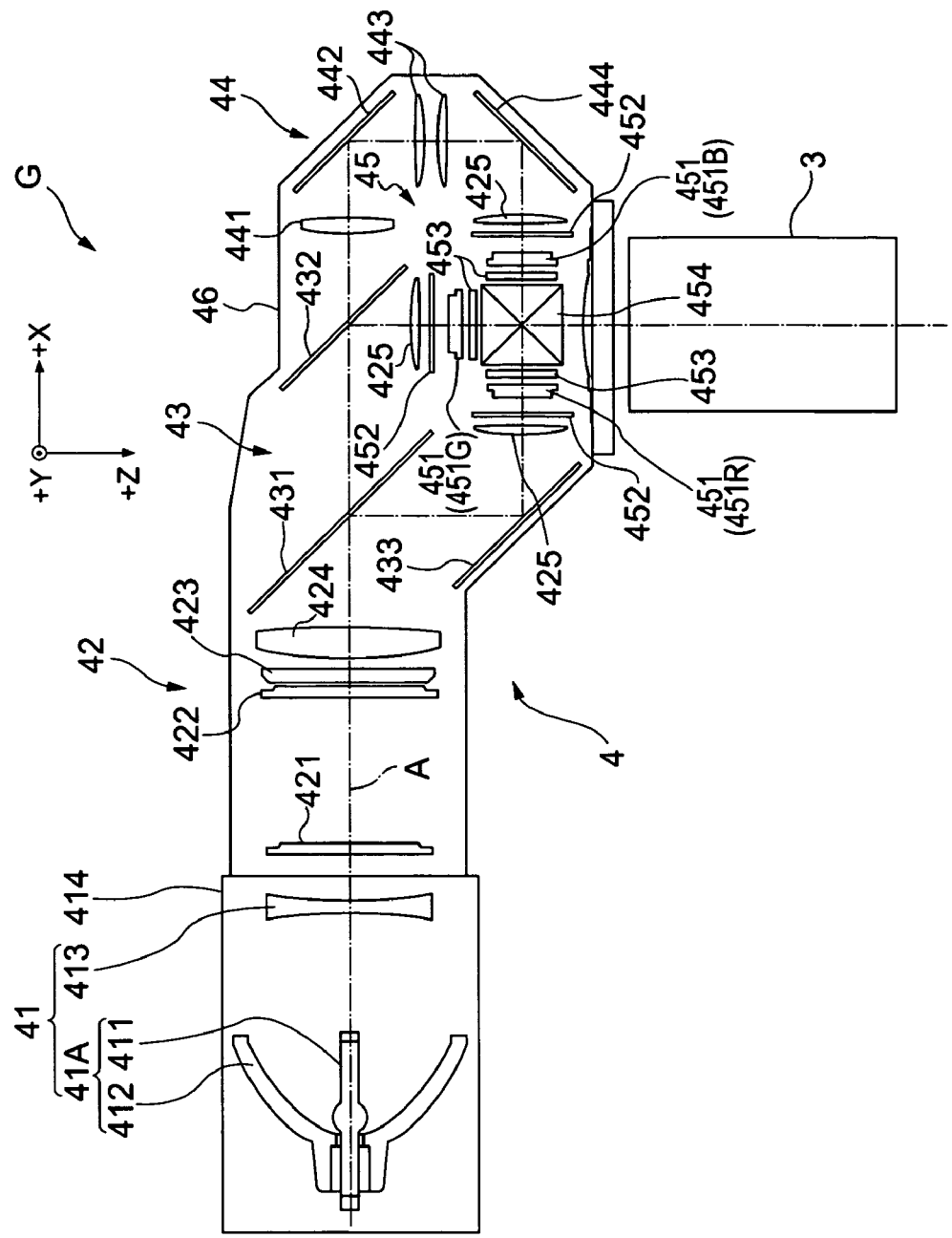
FIG. 3 is a pattern diagram showing a configuration of an optical unit of the projector.

FIG. 3 is a pattern diagram showing a configuration of the projector and, in particular, showing an optical system of the optical unit 4 in detail.

The optical unit 4 is formed into a substantially L-shape in plan view as shown in FIG. 3, and is a unit that optically processes the luminous flux emitted from a light source and forms color images corresponding to the image information under the control of the control board.

The optical unit 4 includes a light source 41, a uniform illumination optical device 42, a color separation optical device 43, a relay optical device 44, an optical device 45 and an optical component housing 46 as shown in FIG. 3.

The light source 41 emits luminous flux toward the uniform illumination optical device 42 under the control of the control board. The light source 41 includes a light source body 41A having a light source lamp 411 as a light source and a reflector 412, a parallelizing lens 413 and a housing member 414 that accommodates and integrating these members 411 to 413 in the interior thereof as shown in FIG. 3.

The uniform illumination optical device 42 is an optical system that illuminates the luminous flux emitted from the light source 41 substantially uniformly in an image forming area of a liquid crystal panel 451 as a light modulating device which constitutes the optical device 45. The uniform illumination optical device 42 includes a first lens array 421, a second lens array 422, a polarization conversion element 423, and a superimposing lens 424 as shown in FIG. 3. A field lens 425 translates the respective partial luminal fluxes emitted from the second lens array 422 into luminous flux parallel to a center axis (main light beam) thereof.

The color separation optical device 43 includes two dichroic mirrors 431 and 432 and a reflection mirror 433 as shown in FIG. 3, and has a function to separate the plurality of partial luminous fluxes emitted from the uniform illumination optical device 42 into color lights of three colors; red, green, and blue by the dichroic mirrors 431 and 432. The dichroic mirror 431 separates the red light, and the red light is reflected by the reflection mirror 433 and is guided to a liquid crystal panel 451R. The dichroic mirror 432 separates the green light and a blue light, and the green light is guided to a liquid crystal panel 451G.

The relay optical device 44 includes a light incident-side lens 441, a relay lens 443, and reflection mirrors 442 and 444 as shown in FIG. 3, and has a function to guide the blue light separated by the color separation optical device 43 to a liquid crystal panel 451B of the optical device 45.

The optical device 45 modulates the incoming luminous flux according to the image information, and forms image light (color images). The optical device 45 includes the three liquid crystal panels 451 (the liquid crystal panel for red light is designated by 451R, the liquid crystal panel for green light is designated by 451G, and the liquid crystal panel for blue light is designated by 451B) as the light modulating device, and an light-incident side polarizer 452 and a light exiting-side polarizer 453 arranged respectively on the luminous flux light-incident side and the luminous flux light exiting-side and a cross-dichroic prism 454 as a light combining optical device as shown in FIG. 3.

The power unit 5 supplies an electric power to respective components (for example, the light source lamp 411, the control board, and so on) which constitute the projector 1, and is disposed at a portion within the L-shape of the optical unit 4.

The lamp drive circuit (ballast) 7 is a circuit for driving the light source lamp 411 which constitutes the light source 41, and is disposed outside the optical unit 4 which is formed into a substantially L-shape in plan view.

The exhaust fan unit 8 intakes warmed air staying in the interior of the projector 1 and discharges the same out of the projector 1 via an exhaust port (not shown) provided on the exterior casing 2. Although it is not shown in detail in the drawing, the exhaust fan unit 8 includes an axial-flow fan and a duct.

Figure 4:
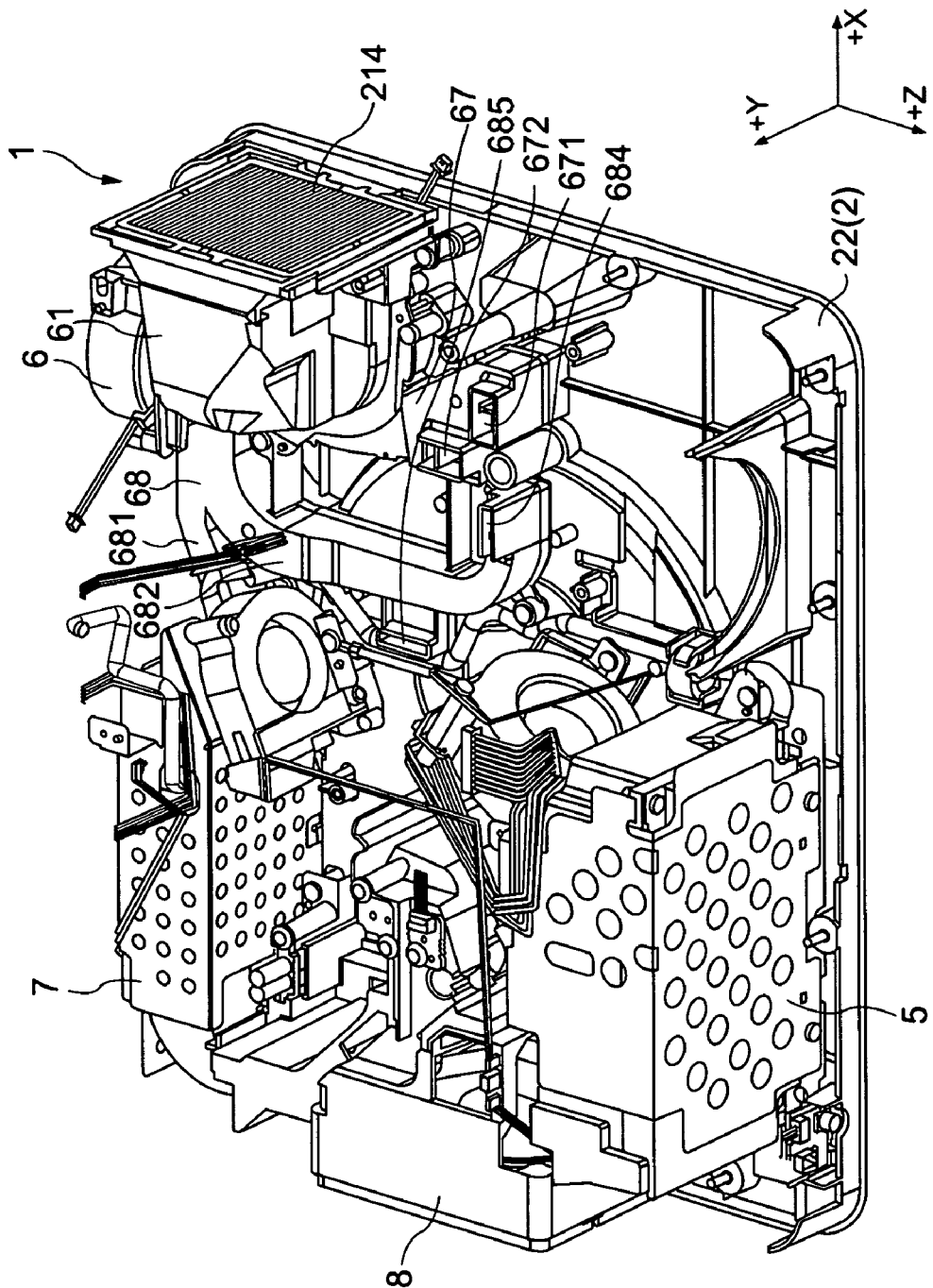
FIG. 4 is an internal perspective view showing the interior of the projector.

FIG. 4 is a perspective view showing the interior of the projector 1, which corresponds to the interior shown in the perspective view in FIG. 2 but the projection lens 3 and the optical unit 4 are removed therefrom.

As shown in FIG. 4, the cooling device 6 introduces outside air into the interior of the projector 1 through the air intake port 213 as a cooling air, and blows the outside air as the cooling air onto the objects to be cooled provided in the interior of the projector 1. The objects to be cooled of the cooling device 6 are the liquid crystal panel 451 (451R, 451G and 451B) side including the light-incident side polarizer 452 and the light exiting-side polarizer 453 of the optical device 45, the lamp drive circuit 7 and the polarization conversion element 423.

Figure 5:
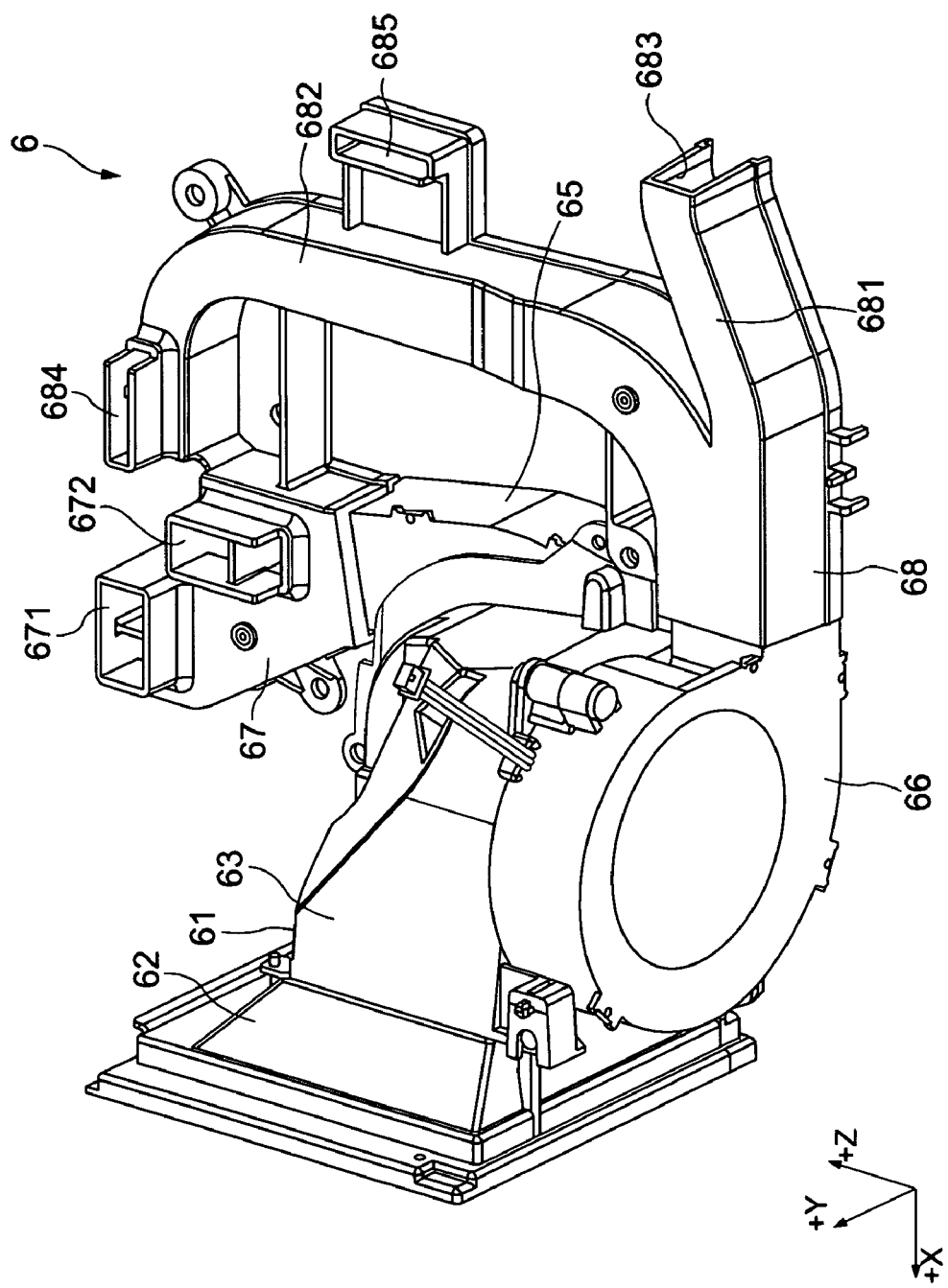
FIG. 5 is a perspective view showing a cooling device.
Figure 6:
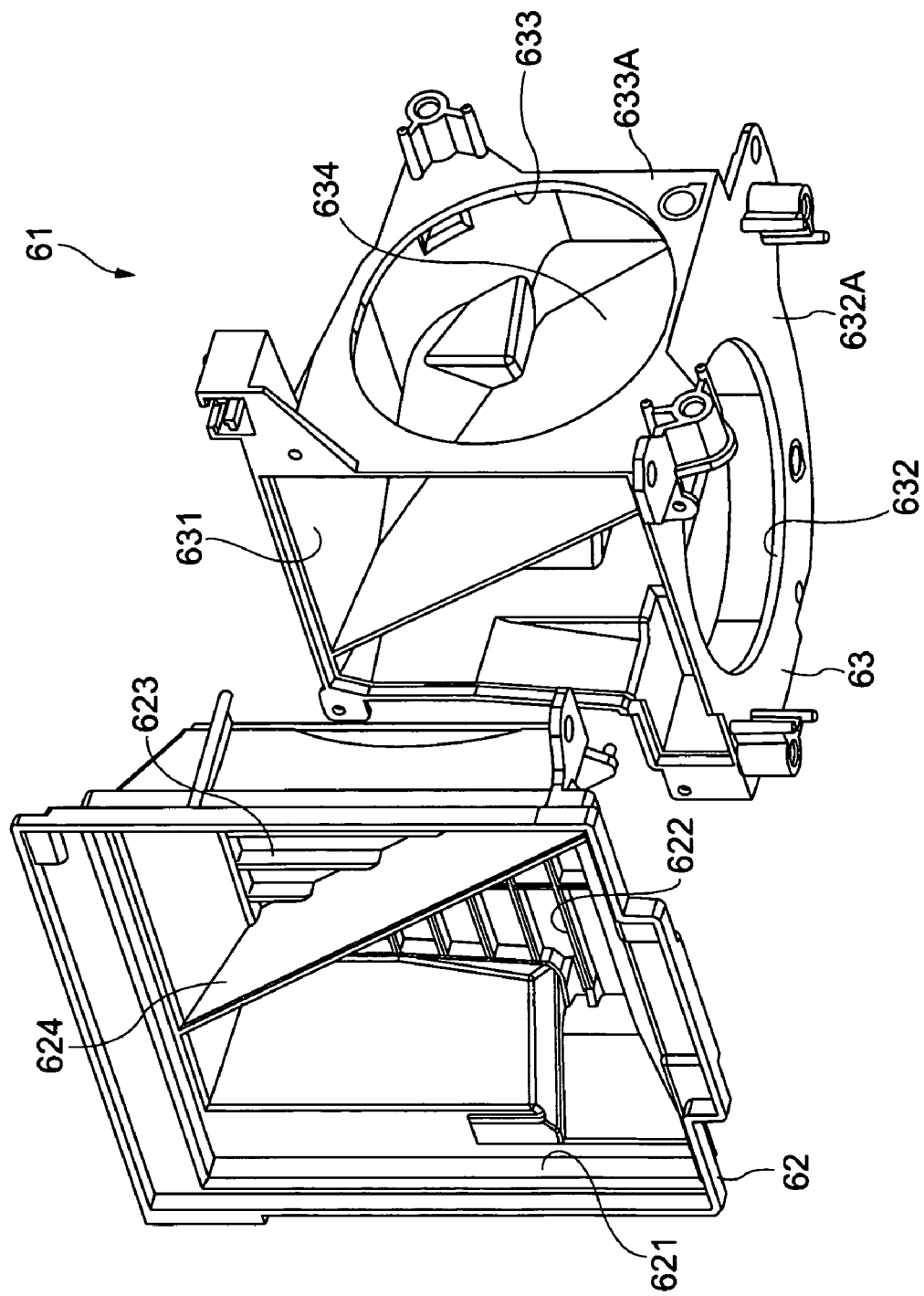
FIG. 6 is an exploded perspective view showing an air intake port-side duct.
Figure 7:
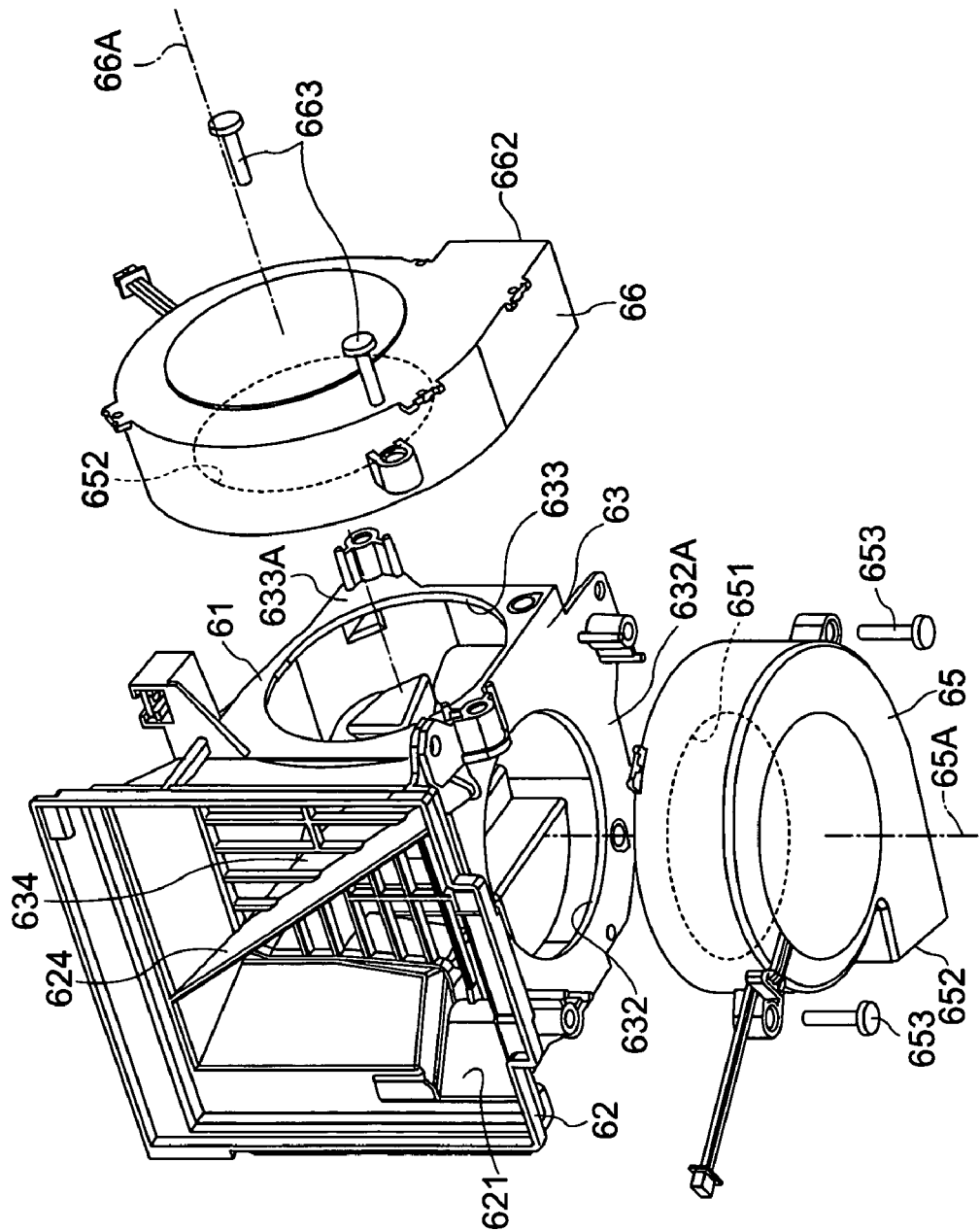
FIG. 7 is an exploded perspective view of the air intake port-side duct and sirocco fans.

FIG. 5 is an enlarged perspective view of the cooling device 6. FIG. 6 is an exploded perspective view of an air intake port-side duct. FIG. 7 is an exploded perspective view of the air intake port-side duct and sirocco fans. As shown in FIG. 5 and FIG. 6, the cooling device 6 includes an air intake port-side duct 61 connected to the air intake port 213 of the exterior casing 2 in communication, two sirocco fans 65 and 66 connected to the air intake port-side duct 61, and two discharge-side ducts 67, 68 (see FIG. 5) which guide cooling air from the two sirocco fans 65, 66 toward the objects to be cooled.

As shown in FIG. 6, the air intake port-side duct 61 includes an air intake port-side duct member 62 and a fan-side duct member 63 as a hollow member connected to each other. The air intake port-side duct member 62 and the fan-side duct member 63 are integrated by being connected by a connecting pin as needed and constitute the air intake port-side duct 61.

The air intake port-side duct member 62 is connected to the air intake port 213 provided on the exterior casing 2 so as to oppose thereto. More specifically, the air intake port-side duct member 62 includes an air intake port connection opening 621 and a first joint opening 622 opened at both sides thereof, and formed into a substantially cylindrical shape, which is substantially square shape in cross section and substantially trapezoidal shape in side view as shown in FIG. 6. The air intake port connection opening 621 is formed to open to have a larger area than the first joint opening 622. The first joint opening 622 is provided with a grid portion 623.

A first partitioning panel 624 as a partitioning wall is provided in the interior of the air intake port-side duct member 62 so as to extend substantially diagonally of a substantially square shape in cross section. The first partitioning panel 624 is formed so as to continue to a second partitioning panel 634 when the air intake port-side duct member 62 is integrated with the fan-side duct member 63.

The fan-side duct member 63 is formed into a substantially rectangular shape in cross section having a second joint opening 631 connected to the first joint opening 622 of the air intake port-side duct member 62 described above, and a first fan connection opening 632 and a second fan connection opening 633 connected to the sirocco fans 65 and 66.

More specifically, the second joint opening 631 has the similar opening shape to the first joint opening 622 and connected to the first joint opening 622 in communication as shown in the drowning. The first fan connection opening 632 and the second fan connection opening 633 are formed into a circular shape similar to the air intake ports 651 and 661 of the sirocco fans to be connected and are connected to the first sirocco fan 65 and the second sirocco fan 66 (see FIG. 5 and FIG. 7).

Planes 632A and 633A having the first fan connection opening 632 and the second fan connection opening 633 respectively are substantially orthogonal to each other. Accordingly, as described later in detail, the two sirocco fans 65 and 66 attached correspondingly to the first fan connection opening 632 and the second fan connection opening 633 respectively are attached to the air intake port-side duct 61 with axes of rotation 65A and 66A thereof directed substantially orthogonally to each other.

The second partitioning panel 634 is provided in the interior of the fan-side duct member 63 as the partitioning wall so as to extend substantially orthogonally of the substantially square shape in cross section so as to partition the first fan connection opening 632 and the second fan connection opening 633. More specifically, the second partitioning panel 634 is provided so as to connect opposing corners of inner angles existing between the planes 632A and 633A, and isolates the first fan connection opening 632 and the second fan connection opening 633 from being in communication.

As described above, the second partitioning panel 634 is continued to the first partitioning panel 624 when the air intake port-side duct member 62 and the fan-side duct member 63 are integrated, and partitions the interior of the air intake port-side duct 61 so as to form flow channels of outside air respectively for the two sirocco fans 65 and 66 by the first and second partitioning panels 624 and 634. In other words, the first and second partitioning panels 624 and 634 as the partitioning walls partition the interior of the air intake port-side duct 61 along the first and second fan connection openings 632 and 633 corresponding to the two sirocco fans 65 and 66 and define the areas in the air intake port-side duct 61.

More specifically, as shown in FIG. 7, the first and second sirocco fans 65 and 66 are the same in performance and dimensions, and are in mirror symmetry with respect to each other (symmetry with respect to a plane having the air intake ports 651 and 661). The first and second sirocco fans 65 and 66 have the air intake ports 651 and 661 in the direction of the axes of rotations 65A and 66A of the fan, and have discharge ports 652 and 662 in the direction of tangent of the rotation of the fans. In this manner, the sirocco fans 65 and 66 intake outside air in the direction of the axes of rotation 65A and 66A of the fans and discharge the outside air in the direction of tangent of the rotation of the fans.

More specifically, the first and second sirocco fans 65 and 66 are attached to the air intake port-side duct 61 by connecting the respective air intake ports 651 and 661 to the first and second fan connection openings 632 and 633 provided on substantially orthogonal planes 643A and 633A via screw members 653 and 663. The first discharge-side duct 67 and the second discharge-side duct 68 which guide cooling air from the two sirocco fans 65 and 66 to the objects to be cooled are connected to the discharge ports 652 and 662, respectively of the first and second sirocco fans 65 and 66.

As shown in FIG. 4 and FIG. 5, the first discharge-side duct 67 is a duct connected to the discharge port 652 of the first sirocco fan 65, and is formed to extend in the direction of projection of the projection lens 3 (+Z-axis direction). The first discharge-side duct 67 is provided with blowing openings 671 and 672 on the upper face thereof for cooling the liquid crystal panel for blue light 451B side of the optical device 45 and the liquid crystal panel for green light 451G side of the optical device 45.

The second discharge-side duct 68 is a duct to be connected to the discharge port 662 of the second sirocco fan 66 and is formed into a bifurcated shape. More specifically, as shown in FIG. 4 and FIG. 5, the second discharge-side duct 68 includes a first duct 681 extending in the direction of the lamp drive circuit 7 (−X-axis direction) which intersects the direction of projection of the projection lens 3 (+Z-axis direction) and a second duct 682 extending so as to bent at the midsection toward the projection lens 3 (+Z-axis direction). The first duct 681 includes an opening 683 at the end thereof so as to cool the interior of the lamp drive circuit 7, and is connected in communication with the interior of the lamp drive circuit 7. The second duct 682 is provided with blowing openings 684 and 685 on the upper face thereof for cooling the liquid crystal panel for red light 451R side of the optical device 45 and the polarization conversion element 423.

As shown in FIG. 4, the cooling device 6 configured in this manner is attached to the lower case 22 at a position opposite side (−Z-axis direction) from the direction of projection (+Z-axis direction) of the image projecting device with respect to the image projecting device G with the side provided with the first sirocco fan 65 oriented so as to oppose the lower case 22. In this case, the cooling device 6 is configured and attached to the lower case 22 in such a manner that the first sirocco fan 65 discharges taken air toward the image projecting device G side and the second sirocco fan 66 discharges taken air in the direction substantially orthogonal to the direction of projection (+Z-axis direction).

With the cooling device 6 configured in this manner, when the sirocco fans 65 and 66 are rotated, the cooling device 6 takes outside air through the air intake port 213 as cooling air, blows the outside air onto the objects to be cooled (liquid crystal panel 451 (451R, 451G, 451B), the lamp drive circuit 7, and the polarization conversion element 423) via the air intake port-side duct 61, the sirocco fans 65 and 66 and the discharge-side ducts 67, 68, and cools these objects to be cooled.

The projector 1 configured in such a manner achieves the following advantages and effects. In other words, according to the projector 1, since the two sirocco fans 65 and 66 are provided, the sirocco fan of compact design in comparison with those in the related art can be employed. Accordingly, the entire mass is reduced while maintaining suction wind force (cooling capacity) by the two first sirocco fan 65 and the second sirocco fan 66.

The first sirocco fan 65 and the second sirocco fan 66 are attached to the air intake port-side duct 61 in such a manner that the axes of rotation 65A and 66A are oriented substantially orthogonal to each other. Therefore, the outside air as cooling air can be discharged in various directions while dispersing the mass in the respective directions.

Therefore, the liquid crystal panel 451 (451R, 451G, 451B) side including the light incident-side polarizer 452 and the light exiting-side polarizer 453 of the optical device 45, the lamp drive circuit 7 and the polarization conversion element 423 as the objects to be cooled integrated therein are efficiently cooled while achieving downsizing of the entire projector 1.

According to the projector 1, the cooling device 6 is disposed at the position opposite side (−Z-axis direction) from the direction of projection (+Z-axis direction) of the image projecting device with respect to the image projecting device G, the first sirocco fan 65 is disposed so as to discharge taken air toward the image projecting device G, and the second sirocco fan 66 is disposed so as to discharge taken air in the direction substantially orthogonal to the direction of projection (+Z-axis direction). Therefore, the cooling air generated by the first sirocco fan 65 is easily guided toward the optical device 45 of the image projecting device G as the objects to be cooled, and the cooling air generated by the second sirocco fan 66 is easily guided toward the lamp drive circuit 7 as the objects to be cooled existing in the direction substantially orthogonal to the direction of projection (+Z-axis direction). Accordingly, the mass of the duct for guiding the cooling air may be reduced, and hence downsizing of the entire projector 1 is achieved.

According to the projector 1, in the case of the projector 1 provided with the projecting position adjusting device 31, the projecting position adjusting device 31 is arranged around the projection lens 3. Therefore, when the cooling device 6 is arranged around the projection lens 3, the projector 1 is upsized. With the configuration described above, even when the projector is provided with the projecting position adjusting device, downsizing of the entire projector 1 is achieved.

According to the projector 1, the partitioning panels 624 and 634 for forming the flow channels respectively for the two sirocco fans 65 and 66 are provided in the interior of the air intake port-side duct 61. Therefore, a configuration in which the first sirocco fan 65 cools the liquid crystal panel for red light 451R side of the optical device 45 and the liquid crystal panel for green light 451G side of the optical device 45, and the second sirocco fan 66 cools the interior of the lamp drive circuit 7, and the liquid crystal panel for blue light 451B side of the optical device 45 and the polarization conversion element 423 is achieved. Accordingly, the amount of wind is suitably dispersed to the respective objects to be cooled, so that more efficient cooling is achieved.

The projector according to an aspect of the invention is not limited to the embodiment shown above, and may be modified as needed without departing from the scope of the invention.

For example, in the embodiment shown above, the two sirocco fans 65 and 66 attached correspondingly to the first fan connection opening 632 and the second fan connection opening 633 respectively are attached to the air intake port-side duct 61 with the axes of rotation 65A and 66A oriented substantially orthogonal to each other. However, it is also possible to set the planes 632A and 633A so as to intersects with each other and attach the two sirocco fans 65 and 66 with the axes of rotation 65A and 66A oriented so as to intersect with each other. In this configuration, outside air as cooling air is advantageously discharged in various directions while dispersing the mass in the same manner as the embodiment shown above.

In the embodiment shown above, the projector having the three liquid crystal panels 451, so called the projector of a three-panel type has been exemplified. However, the projector according to an aspect of the invention is not limited thereto, and the invention may be applied to a projector of a single-panel type having one liquid crystal panel or a projector having two liquid crystal panels, or a projector having four or more liquid crystal panels without any problem.

In the embodiment shown above, the liquid crystal panel is a light transmissive liquid crystal panel having a light-incident plane and a light-exiting plane separately. However, a reflective liquid crystal panel in which the light-incident plane and the light-exiting plane are identical is also applicable. In the embodiment shown above, the liquid crystal panel is employed as the light modulating device. However, other light modulating devices other than the liquid crystal panel, such as a device employing a micro mirror may be employed. In this case, the polarizers 452, 453 on the luminous flux incident-side and the luminous flux exiting-side may be omitted.

The projector according to the embodiment of the invention achieves downsizing of the entire projector, and is capable of cooling the objects to be cooled integrated therein efficiently, so that it is used as a projector superior in portability.

The entire disclosure of Japanese Patent Application No. 2007-083475, filed Mar. 28, 2007 is expressly incorporated by reference herein.

What is claimed is:

1. A projector comprising:
   an image projecting device that modulates luminous flux emitted from a light source according to image information and projects the same in an enlarged scale; and
   an exterior casing that includes an air intake port for introducing outside air into the interior thereof and accommodates the image projecting device in the interior thereof; and
   a cooling device that cools the interior of the exterior casing by the outside air introduced via the air intake port,
   wherein the cooling device includes a first sirocco fan and a second sirocco fan that discharge air taken along axes of rotation of the fans to the direction along tangent of rotation, and an air intake port-side duct that guides the outside air introduced via the air intake port toward the first sirocco fan and the second sirocco fan, and
   wherein:
      the cooling device is disposed at a position opposite side from the direction of projection of the image projecting device with respect to the image projecting device,
      the first sirocco fan and the second sirocco fan are disposed with axes of rotation thereof oriented so as to intersect with each other,
      the axis of rotation of the first sirocco fan is substantially orthogonal to the axis of rotation of the second sirocco fan,
      the first sirocco fan is disposed so as to discharge taken air toward the image projecting device,
      the second sirocco fan is disposed so as to discharge taken air in the direction substantially orthogonal to the direction of projection,
      the air intake port-side duct includes a hollow member which has a substantially parallelepiped shape and introduces the outside air into the interior thereof,
      the hollow member is formed with a first deriving port and a second deriving port that derive the outside air introduced in the interior thereof to the first sirocco fan and the second sirocco fan respectively on a first side wall and a second side wall of the hollow member which intersect with each other, and
      the air intake port-side duct is provided with a partitioning wall in the interior thereof so as to define flow channels respectively for the first sirocco fan and the second sirocco fan.

2. The projector according to claim 1,
   wherein the image projecting device is provided with a projecting position adjusting device that adjusts the position of an optical image to be projected on the side of the direction of projection of the image projecting device.

3. The projector according to claim 1, wherein the partitioning wall extends obliquely relative to the axis of rotation of the first sirocco fan and the axis of rotation of the second sirocco fan.

* * * * *